United States Patent
Chillar et al.

(10) Patent No.: US 8,627,643 B2
(45) Date of Patent: Jan. 14, 2014

(54) SYSTEM AND METHOD FOR MEASURING TEMPERATURE WITHIN A TURBINE SYSTEM

(75) Inventors: Rahul Jaikaran Chillar, Marietta, GA (US); Julio E. Mestroni, Marietta, GA (US); Eric J. Kauffman, Marietta, GA (US); Adil Ansari, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 12/850,770

(22) Filed: Aug. 5, 2010

(65) Prior Publication Data

US 2012/0031106 A1   Feb. 9, 2012

(51) Int. Cl.
*F02C 7/00*  (2006.01)
*G01J 5/02*  (2006.01)

(52) U.S. Cl.
USPC ......... 60/39.091; 60/39.182; 60/779; 60/803; 165/288; 250/338.1; 374/121

(58) Field of Classification Search
USPC .............. 60/39.091, 39.182, 39.24, 772, 793, 60/779, 803; 165/288; 250/338.1; 374/121
See application file for complete search history.

(56) References Cited

U.S. PATENT DOCUMENTS

| | | | |
|---|---|---|---|
| 4,710,095 A | | 12/1987 | Freberg et al. |
| 5,099,121 A | * | 3/1992 | Allen ........................ 250/339.04 |
| 5,385,202 A | * | 1/1995 | Drosdziok et al. ............ 165/11.1 |
| 6,031,231 A | * | 2/2000 | Kimata et al. ................. 250/332 |
| 6,422,745 B1 | * | 7/2002 | Glasheen et al. .............. 374/131 |
| 6,748,733 B2 | * | 6/2004 | Tamaro ....................... 60/39.182 |
| 6,931,857 B2 | | 8/2005 | Irwin et al. |
| 6,962,043 B2 | * | 11/2005 | Venkateswaran et al. . 60/39.091 |
| 7,231,307 B2 | * | 6/2007 | Takei et al. ...................... 702/99 |
| 7,332,716 B2 | * | 2/2008 | Hamrelius et al. ............. 250/332 |
| 7,422,365 B2 | * | 9/2008 | Chamberlain et al. ......... 374/120 |
| 7,484,369 B2 | * | 2/2009 | Myhre ............................ 60/803 |
| 8,167,483 B2 | * | 5/2012 | Jensen .......................... 374/120 |
| 2008/0166489 A1 | * | 7/2008 | Strock et al. ................ 427/421.1 |
| 2009/0272122 A1 | | 11/2009 | Shi et al. |
| 2010/0143090 A1 | | 6/2010 | Smith et al. |

OTHER PUBLICATIONS

A. Rogalski, "Infrared Detectors" 2000, Gordon and Breach Science Publishers, pp. 85-86.*
U.S. Appl. No. 12/850,793, filed Aug. 5, 2010, Chillar et al.
U.S. Appl. No. 12/850,777, filed Aug. 5, 2010, Chillar et al.
U.S. Appl. No. 12/718,932, filed Mar. 5, 2010, Ansari et al.
U.S. Appl. No. 12/772,601, filed May 3, 2010, Chillar et al.
U.S. Appl. No. 12/772,626, filed May 3, 2010, Ansari et al.

* cited by examiner

*Primary Examiner* — Phutthiwat Wongwian
*Assistant Examiner* — Steven Sutherland
(74) *Attorney, Agent, or Firm* — Fletcher Yoder P.C.

(57) ABSTRACT

A system includes a radiation detector array configured to direct a field of view toward multiple conduits within a fluid flow path from a turbine into a heat exchanger. The radiation detector array is configured to output a signal indicative of a multi-dimensional temperature profile of the fluid flow path based on thermal radiation emitted by the conduits. The system also includes a controller communicatively coupled to the radiation detector array. The controller is configured to determine a temperature variation across the fluid flow path based on the signal, and to compare the temperature variation to a threshold value.

18 Claims, 4 Drawing Sheets

SYSTEM AND METHOD FOR MEASURING TEMPERATURE WITHIN A TURBINE SYSTEM

BACKGROUND OF THE INVENTION

The disclosed subject matter relates to a system and method for measuring temperature within a turbine system.

Certain power generation systems include a gas turbine engine configured to combust a mixture of fuel and compressed air to produce hot combustion gases. The combustion gases may flow through a turbine to generate power for a load, such as an electric generator. To enhance efficiency, certain power generation systems employ a heat recovery steam generator (HRSG) to capture energy from the hot combustion gases exhausted from the turbine. In general, HRSGs convey a fluid, such as water, through multiple conduits in a direction crosswise (e.g., substantially perpendicular) to the flow of exhaust gas. As the exhaust gas flows across the conduits, heat is transferred from the exhaust gas to the water, thereby producing steam. The steam is then directed through a steam turbine to generate rotational motion, thereby driving a load, such as an electric generator. The steam is exhausted to a condenser, which cools the steam to generate water for the HRSG. For example, the condenser conveys a fluid, such as water, through multiple conduits in a direction crosswise (e.g., substantially perpendicular) to the flow of steam. As the steam flows across the conduits, heat from the steam is transferred to the water, thereby condensing the steam into water.

As will be appreciated, temperature variations across the exhaust flow into the HRSG may decrease efficiency of the steam generation process. For example, if a portion of the exhaust flow is cooler than desired, water flow through certain conduits may not be sufficiently heated to produce steam. Conversely, if a portion of the exhaust flow is warmer than desired, certain conduits may experience excessive steam pressure. Such flow variations within the HRSG may decrease HRSG efficiency and/or result in premature wear of certain HRSG components. Similarly, temperature variations across the steam flow into the condenser may decrease efficiency of the steam turbine. For example, variations in the steam temperature distribution may induce density variations within the last stage of the steam turbine, thereby reducing turbine efficiency.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a radiation detector array configured to direct a field of view toward multiple conduits within a fluid flow path from a turbine into a heat exchanger. The radiation detector array is configured to output a signal indicative of a multi-dimensional temperature profile of the fluid flow path based on thermal radiation emitted by the conduits. The system also includes a controller communicatively coupled to the radiation detector array. The controller is configured to determine a temperature variation across the fluid flow path based on the signal, and to compare the temperature variation to a threshold value.

In a second embodiment, a system includes a turbine configured to provide a flow of a first fluid in a downstream direction, and a heat exchanger configured to receive the flow of the first fluid and to transfer heat from the first fluid to a second fluid. The heat exchanger includes multiple conduits configured to convey the second fluid through the flow of the first fluid. The system also includes a radiation detector array directed toward a cross-section of the heat exchanger crosswise to a flow direction of the first fluid. The radiation detector array is configured to output a signal indicative of a multi-dimensional temperature profile of the cross-section based on thermal radiation emitted by the conduits.

In a third embodiment, a method includes obtaining a measurement of thermal radiation from multiple conduits within a fluid flow path from a turbine into a heat exchanger via a radiation detector array. The method also includes determining a multi-dimensional temperature profile of the fluid flow path based on the measurement. The method further includes determining a temperature variation across the fluid flow path based on the multi-dimensional temperature profile, and comparing the temperature variation to a threshold value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
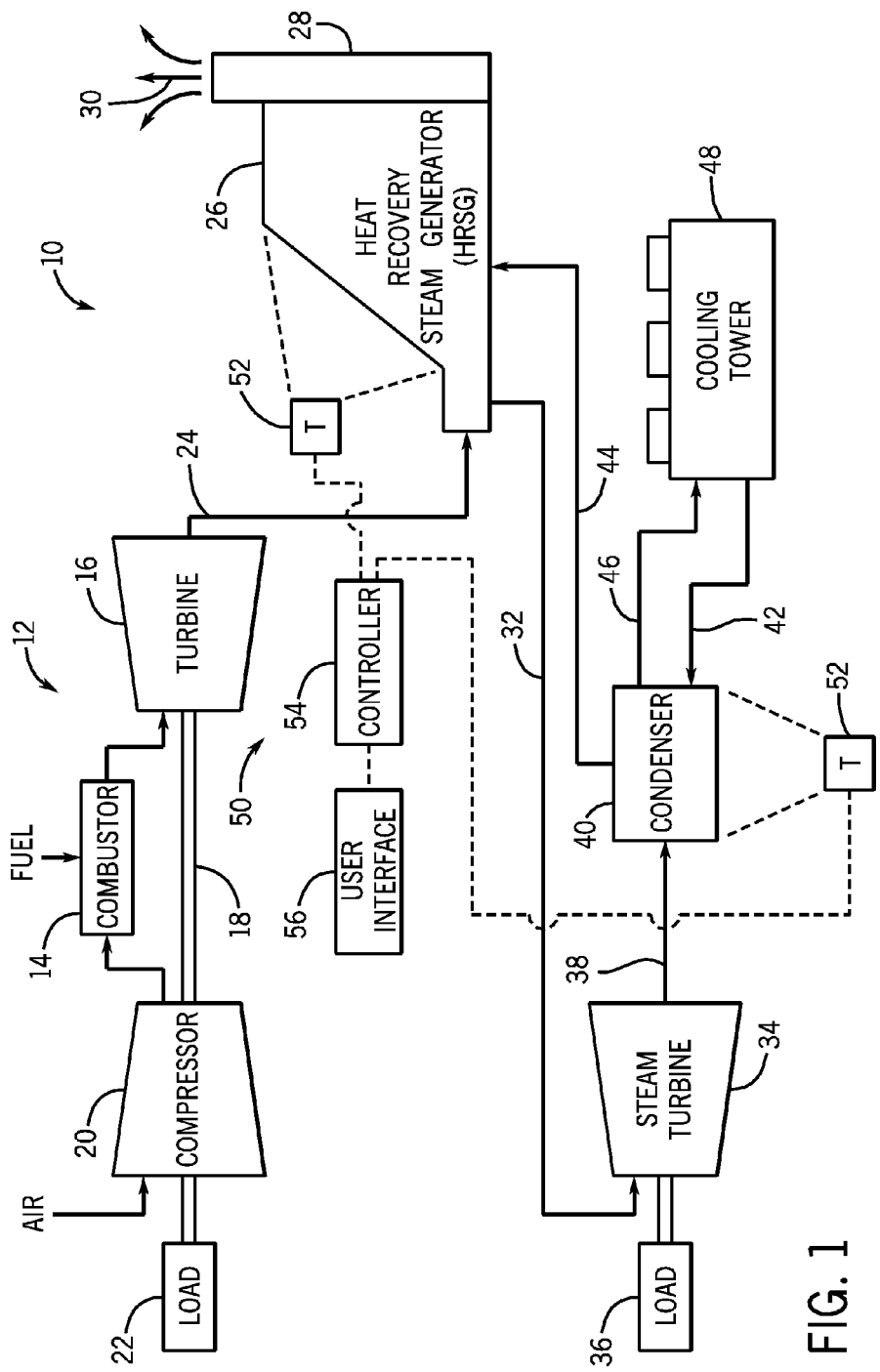
FIG. 1 is a schematic diagram of an embodiment of a combined cycle power generation system having a gas turbine, a steam turbine, an HRSG, a condenser, and a thermal measurement system configured to detect an excessive temperature variation across a fluid flow path from a turbine into a heat exchanger.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Temperature variations across an exhaust flow into an HRSG may decrease efficiency of the steam generation process. For example, if a portion of the exhaust flow is cooler than desired, water flow through certain conduits may not be sufficiently heated to produce steam. Conversely, if a portion of the exhaust flow is warmer than desired, certain conduits may experience excessive steam pressure. Such flow variations within the HRSG may decrease HRSG efficiency and/or result in premature wear of certain HRSG components, as compared to HRSGs which receive an exhaust flow having a substantially uniform temperature distribution (e.g., temperature variations less than approximately 25, 20, 15, 10, 7, 5, or 3 degrees Celsius, or less). For example, excessive steam pressure and/or thermal stress may reduce the useful life of conduits, valves, connectors and/or other components within the HRSG. Therefore, it may be desirable to monitor a temperature profile of the exhaust flow into the HRSG to detect an excessive temperature variation (e.g., a temperature variation greater than approximately 3, 5, 7, 10, 15, 20, or 25 degrees Celsius, or more).

Similarly, temperature variations across a steam flow from a steam turbine into a condenser may decrease efficiency of the steam turbine. For example, variations in the steam temperature distribution may induce density variations within the last stage of the steam turbine, thereby reducing turbine efficiency. In addition, such density variations may induce excessive wear on the turbine blades as the blades pass through regions of varying density. Consequently, steam temperature variations may decrease steam turbine efficiency and/or result in premature wear of certain steam turbine components, as compared to steam turbines which output a steam flow having a substantially uniform temperature distribution (e.g., temperature variations less than approximately 25, 20, 15, 10, 7, 5, or 3 degrees Celsius, or less). Therefore, it may be desirable to monitor a temperature profile of the steam flow into the condenser to detect an excessive temperature variation (e.g., a temperature variation greater than approximately 3, 5, 7, 10, 15, 20, or 25 degrees Celsius, or more).

Embodiments of the present disclosure may detect a temperature variation, such as an excessive temperature variation, across a fluid flow path from a turbine into a heat exchanger by measuring thermal radiation of conduits extending through the fluid flow path via a thermal radiation detector array. For example, certain embodiments may detect a temperature variation across an exhaust flow from a gas turbine into an HRSG and/or across a steam flow from a steam turbine into a condenser. Such configurations may monitor an entire two-dimensional cross-section of the fluid flow path, thereby facilitating detection of operating conditions that may result in decreased efficiency and/or premature wear of turbine/heat exchanger components. For example, certain embodiments include a radiation detector array directed toward multiple conduits within a fluid flow path from a turbine into a heat exchanger. The radiation detector array is configured to output a signal indicative of a multi-dimensional (e.g., two-dimensional or three-dimensional) temperature profile of the fluid flow path based on thermal radiation emitted by the conduits. In addition, a controller, communicatively coupled to the thermal radiation detector array, is configured to detect an excessive temperature variation across the fluid flow path based on the signal (e.g., by determining a temperature variation and comparing the temperature variation to a threshold value). For example, the controller may be configured to detect the excessive temperature variation if a temperature difference between at least one of the conduits and an average temperature of the fluid flow path exceeds a threshold value. Alternatively, the controller may be configured to detect the excessive temperature variation if a temperature difference between a first conduit and a second conduit exceeds a threshold value. Because the thermal radiation detector array may monitor the entire two-dimensional cross-section of the fluid flow path, substantially all temperature variations within the fluid flow may be detected. Consequently, an operator may be informed of an excessive temperature variation and/or the controller may terminate fluid flow through the heat exchanger before the condition adversely affects the turbine and/or heat exchanger. As a result, the useful life of the turbine/heat exchanger components may be extended, thereby decreasing operational costs of a power generation system.

FIG. 1 is a schematic diagram of an embodiment of a combined cycle power generation system 10 having a gas turbine, a steam turbine, an HRSG, and a condenser. The system 10 is described below for the purpose of providing context for embodiments of a thermal measurement system configured to detect an excessive temperature variation across a fluid flow path from a turbine into a heat exchanger. It should be appreciated that the thermal measurement system described below may be utilized for detecting excessive temperature variations within other power generation systems, turbine systems, processing plants, or any other system including a turbine providing a fluid flow to a heat exchanger. In the present embodiment, the system 10 includes a gas turbine engine 12 including a combustor 14, a turbine 16, a drive shaft 18, and a compressor 20. The combustor 14 receives fuel, such as natural gas, which may be injected under pressure from fuel nozzles. This fuel is mixed with compressed air and combusted within the combustor 14, thereby generating hot pressurized exhaust gases. The combustor 14 directs the exhaust gases toward an exhaust outlet of the turbine 16. As the exhaust gases from the combustor 14 pass through the turbine 16, blades in the turbine 16 are driven to rotate, thereby rotating the drive shaft 18 along an axis of the gas turbine engine 12. As illustrated, the drive shaft 18 may be connected to various components of the gas turbine engine 12, including the compressor 20.

The drive shaft 18 connects the turbine 16 to a rotor of the compressor 20 which includes blades. Thus, rotation of turbine blades in the turbine 16 causes the drive shaft 18 connecting the turbine 16 to the compressor 20 to rotate blades within the compressor 20. The rotation of blades in the compressor 20 causes the compressor 20 to compress air received via an air intake. The compressed air is then fed to the combustor 14 and mixed with fuel to facilitate combustion. The drive shaft 18 is also connected to a load 22, which may be a stationary load, such as an electrical generator, for producing electrical power in a power plant. Indeed, the load 22 may be any suitable device that is powered by the rotational output of the gas turbine engine 12.

Exhaust gas 24 from the gas turbine engine 12 is directed to an HRSG 26. As discussed in detail below, the HRSG 26 is a heat exchanger which includes multiple conduits configured to convey a secondary fluid, such as water, in a direction crosswise (e.g., substantially perpendicular) to the flow of exhaust gas 24 through the HRSG 26. As the exhaust gas 24 flows across the conduits, heat is transferred from the exhaust gas to the water, thereby producing steam. In addition, the temperature of the exhaust gas is significantly reduced. After passing through the HRSG 26, the cooled exhaust gas is released to the atmosphere through a stack 28, as indicated by the arrows 30. As illustrated, the generated steam 32 is directed toward a steam turbine 34.

As the high pressure steam 32 passes through the steam turbine 34, blades within the turbine 34 are driven to rotate, thereby driving a second load 36. While the present embodiment includes two loads 22 and 36, it should be appreciated that the gas turbine engine 12 and the steam turbine 34 may be coupled to the same load in alternative embodiments. As the steam passes through the steam turbine 34, the pressure is reduced such that low pressure steam 38 is expelled from the turbine 34. As illustrated, the low pressure steam 38 flows into a condenser 40 which condenses the steam. As discussed in detail below, the condenser 40 is a heat exchanger which includes multiple conduits configured to convey a secondary fluid, such as water, in a direction crosswise (e.g., substantially perpendicular) to the flow of steam. As the steam flows across the conduits, heat from the steam is transferred to water 42, thereby condensing the steam into water 44. The water 44 flows back to the HRSG 26 where it is heated by the exhaust gas 24 to produce more high pressure steam 32. The cooling water 42 is heated within the condenser 40 and exits as hot water 46. The hot water 46 is directed toward a cooling tower 48 which cools the hot water 46 to produce cool water 42 for the condenser 40. While the high pressure steam 32 is directed toward a steam turbine 34 in the present embodiment, it should be appreciated that alternative embodiments may utilize the high pressure steam 32 for an industrial process (e.g., gasification) before returning the low pressure steam 38 to the condenser 40.

As illustrated, the power generation system 10 includes a thermal measurement system 50 configured to detect temperature variations, such as excessive temperature variations, across a fluid flow path from a turbine into a heat exchanger. In the present embodiment, the thermal measurement system 50 includes two radiation detector arrays, such as the illustrated thermal radiation detector arrays 52, each directed toward a fluid flow path from a turbine into a heat exchanger. Specifically, one thermal radiation detector array 52 is directed toward the exhaust gas flow 24 from the gas turbine 16 into the HRSG 26. In addition, a second thermal radiation detector array 52 is directed toward the steam flow 38 from the steam turbine 34 into the condenser 40. The thermal radiation detector arrays 52 are configured to output a signal indicative of a multi-dimensional (e.g., two-dimensional) temperature profile of the fluid flow path based on thermal radiation emitted by conduits within the HRSG 26 or condenser 40. For example, as discussed in detail below, each thermal radiation detector array 52 may include multiple thermopile elements, with each element directed toward a different region of the fluid flow path. Because each thermopile element is configured to output a temperature of the respective region, a two-dimensional temperature profile of the fluid flow path may be established. In certain embodiments, each thermal radiation detector array 52 is directed toward a cross-section of the heat exchanger crosswise (e.g., substantially perpendicular) to a direction of the fluid flow. In such embodiments, an entire two-dimensional cross-section of the fluid flow path may be monitored, thereby ensuring that substantially any temperature variation across the fluid flow will be detected. Furthermore, because the thermal radiation detector arrays 52 may monitor the conduit temperature without direct contact with the fluid, the detector arrays 52 may be positioned outside of the HRSG 26 and the condenser 40, thereby protecting the detector arrays 52 from the flow of hot fluid and substantially extending the useful life of the detector arrays 52.

As will be appreciated, the thermal radiation detector array 52 measures electromagnetic energy from an object to determine a temperature of the object. For example, the detector array 52 may measure thermal radiation having a wavelength within an infrared spectrum. As discussed in detail below, the intensity of certain infrared emissions may be proportional to the temperature of the object. In certain embodiments, the thermal radiation detector array 52 is configured to detect such emissions and output a signal indicative of temperature. It also should be appreciated that various thermal radiation detector array configurations may be employed to determine the two-dimensional temperature profile of the fluid flow path from the turbine to the heat exchanger. As previously discussed, certain detector arrays 52 may include a series of thermopile elements. As will be appreciated, a thermopile includes multiple thermocouples connected in series to obtain an enhanced signal output. Thermocouples measure the temperature difference between hot and cold junctions by generating an electromotive force (emf) between the junctions. For example, the hot junctions may be directed toward the heat exchanger conduits to measure thermal radiation, and the cold junctions may be coupled to a heat sink such that a temperature of the cold junctions is substantially equal to the ambient temperature. Because the thermocouples are connected in series, the thermopile sums the emf of all the thermocouples to provide an enhanced voltage output. Establishing an array of thermopile elements may generate a two-dimensional temperature profile of the fluid flow path, with each thermopile element providing a temperature of a respective monitored region. In certain embodiments, the thermopile array may be a single solid state device, with each thermopile element formed on the surface of the device. Alternative embodiments may employ radiation pyrometers, infrared detectors (e.g., charge-coupled device (CCD), focal-plane array (FPA), etc.) or other thermal radiation detector arrays configured to output a two-dimensional temperature profile of the fluid flow path from the turbine to the heat exchanger.

In the present embodiment, each thermal radiation detector array 52 is communicatively coupled to a controller 54. The controller 54 is configured to detect an excessive temperature variation across the fluid flow path based on a signal indicative of the two-dimensional temperature profile output by each thermal radiation detector array 52 (e.g., by determining a temperature variation and comparing the temperature variation to a threshold value). As previously discussed, excessive temperature variations across the fluid flow may decrease efficiency of the power generation system 10 and/or prematurely wear certain components within the turbine and/or heat exchanger. Consequently, the controller 54 may monitor the two-dimensional temperature profile measured by each thermal radiation detector array 52 to determine whether a temperature variation across the fluid flow exceeds turbine/heat exchanger design criteria.

While a single two-dimensional array is directed toward each heat exchanger (e.g., the HRSG 26 and the condenser 40) in the present embodiment, it should be appreciated that multiple two-dimensional arrays may be employed in alternative embodiments to monitor various areas of the heat exchangers. For example, the thermal radiation detector array 52 may include multiple two-dimensional arrays directed toward various two-dimensional cross-sections of the heat exchanger along the direction of fluid flow. In certain embodiments, the two-dimensional arrays may be tightly spaced along the flow direction such that the controller 54 may generate a three-dimensional temperature profile of the fluid flow path, thereby enabling detection of an excessive temperature variation at substantially any location within the heat exchanger.

The present embodiment also includes a user interface 56 communicatively coupled to the controller 54. The user interface 56 may include a numerical display configured to display the temperature detected by each element of the thermal radiation detector array 52 and/or a graphical interface configured to display the temperatures as a function of time. In this manner, an operator may monitor the temperature profile to identify an excessive temperature variation. In addition, the user interface 56 may include a visual and/or audible alarm configured to alert the operator of the excessive temperature variation. For example, if the controller 54 determines that a temperature of one conduit within the fluid flow path is substantially greater than an average fluid flow path temperature, the audible and/or visual alarm may be activated. In certain embodiments, the controller 54 is communicatively coupled to the gas turbine system 10, and configured to automatically reduce or terminate fluid flow through the heat exchanger in response to detection of an excessive temperature variation. For example, the controller 54 may adjust the flow path of the exhaust gas 24 such that the gas bypasses the HRSG 26. Similarly, steam flow 32 to the steam turbine 34 may be reduced or terminated if an excessive temperature variation is detected within the condenser 40.

Figure 2:
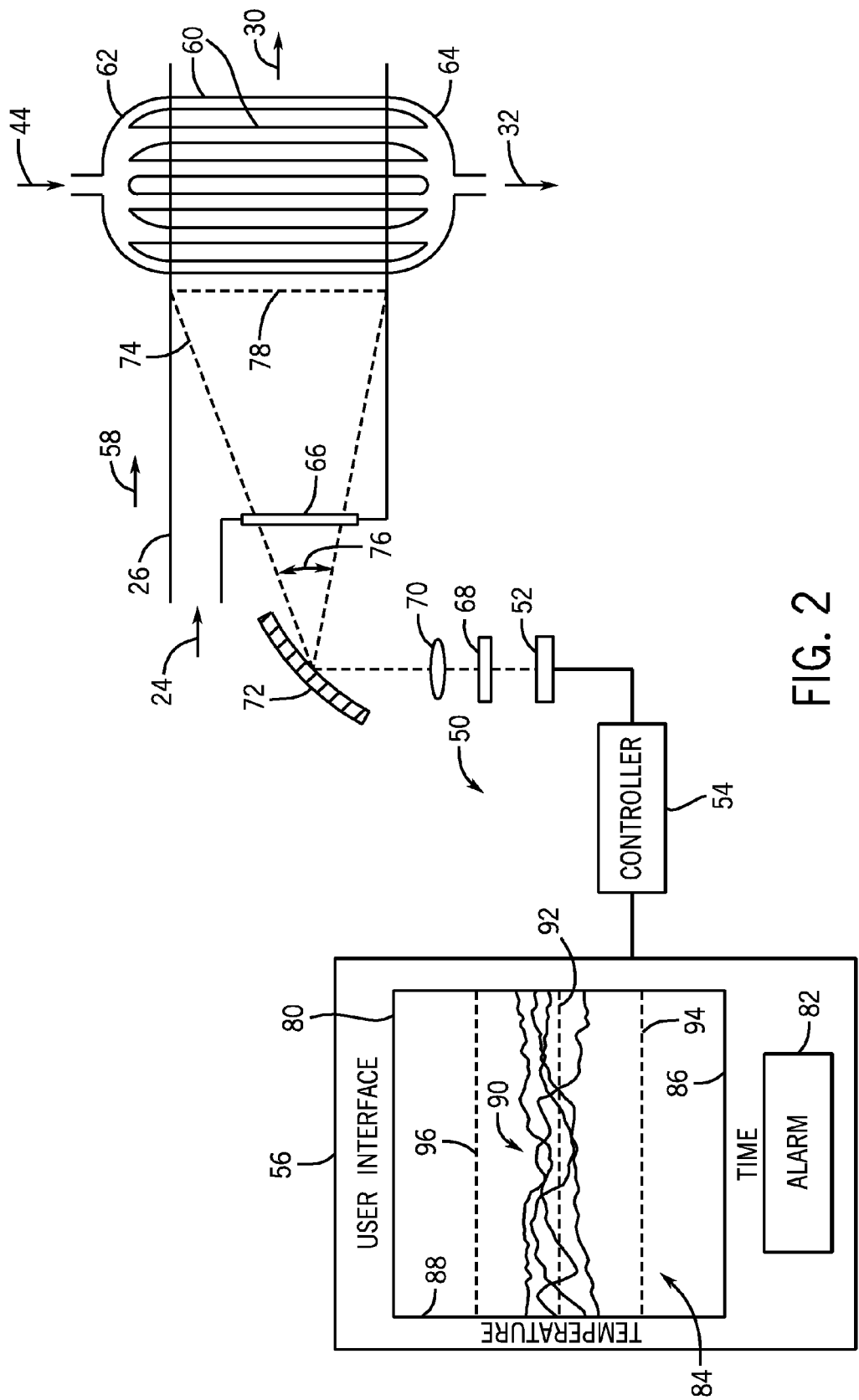
FIG. 2 is a schematic diagram of an embodiment of the thermal measurement system directed toward a fluid flow path from the gas turbine into the HRSG.

FIG. 2 is a schematic diagram of an embodiment of the thermal measurement system 50 directed toward a fluid flow path from the gas turbine 16 into the HRSG 26. As illustrated, the exhaust gas 24 flows into the HRSG 26 in a downstream direction 58. The HRSG 26 includes multiple conduits 60 configured to convey a secondary fluid, such as water, in a direction crosswise (e.g., substantially perpendicular) to the downstream direction 58. As the exhaust gas 24 flows across the conduits 60, heat is transferred from the exhaust gas 24 to the water, thereby producing steam. In the present embodiment, the water 44 is supplied to the conduits 60 by a first manifold 62, and the steam 32 is expelled through a second manifold 64. As previously discussed, the steam 32 is directed toward the steam turbine 34 to drive the load 36, while the cooled exhaust gas is directed toward the stack 28. While six conduits 60 are employed within the illustrated HRSG 26, it should be appreciated that significantly more conduits may be utilized within other HRSG configurations. In certain embodiments, the conduits 60 may be disposed along the downstream direction 58, and along a direction perpendicular to the flow path. In further embodiments, the HRSG 26 may include multiple stages, with each stage configured to generate steam for a separate steam turbine. While the illustrated thermal radiation detector array 52 is directed toward a fluid flow path from the gas turbine 16 into the HRSG 26, it should be appreciated that a similar configuration may be employed to monitor the two-dimensional temperature profile a fluid flow path from the steam turbine 34 into the condenser 40.

In the illustrated configuration, the thermal radiation detector array 52 is positioned outside of the HRSG 26, thereby protecting the thermal measurement system 50 from the hot exhaust gas 24 passing through the HRSG 26. As illustrated, the HRSG 26 includes a viewing port 66 configured to enable the thermal radiation detector array 52 to receive thermal radiation emitted by the conduits 60 within the HRSG 26. As will be appreciated, the viewing port 66 may be composed of a material that is substantially transparent to the wavelengths measured by the array 52. For example, if the detector array 52 is configured to monitor thermal radiation within an infrared spectrum, the viewing port 66 may be composed of a material substantially transparent to infrared radiation, such as Germanium or Silicon, for example. As will be appreciated, selection of the material may also be dependent on the expected temperature of the fluid flow through the HRSG 26.

In certain embodiments, the viewing port 66 may be exposed to fluid temperatures in excess of approximately, 500, 600, 700, 800, 900, 1000, 1100 or 1200 degrees Celsius, or more. Consequently, the transparent material may be selected to resist such temperatures. Because the viewing port 66 enables the detector array 52 to be positioned outside of the HRSG 26, the thermal radiation detector array 52 may measure a two-dimensional temperature profile of the fluid flow path from the turbine 16 into the HRSG 26 without exposure to hot exhaust gas, thereby substantially extending the operational life of the detector array 52. In alternative embodiments, the detector array 52 may be located inside of a thermally insulated container within the HRSG 26. In such embodiments, a viewing port 66, coupled to the insulated container, will separate the detector array 52 from the fluid flow, thereby protecting the array 52 from excessive temperatures.

In the present embodiment, a filter 68 and a lens 70 are positioned between the viewing port 66 and the thermal radiation detector array 52. In certain embodiments, the detector array 52 may include multiple thermopile elements to measure the thermal radiation emitted by the conduits 60. In such embodiments, each thermopile element includes multiple thermocouples electrically connected in series to provide an enhanced output signal. As will be appreciated, the thermopile elements may detect a variety of thermal radiation wavelengths. For example, certain thermopile elements may detect electromagnetic wavelengths within the infrared spectrum ranging from approximately 0.8 to 40 microns. As will be further appreciated, a particular subset of wavelengths within the infrared spectrum may be well-suited for temperature determination. Consequently, a band-pass filter 68 may be employed to limit the range of wavelengths incident upon the detector array 52. For example, in certain embodiments, the band-pass filter 68 may be configured to block electromagnetic radiation having a wavelength outside of a range between approximately 2 to 20, 4 to 18, 6 to 16, 8 to 14, or about 7.2 to 12.4 microns. Consequently, the filter 68 facilitates passages of thermal radiation onto the detector array 52 having a wavelength range suitable for each thermopile element to output a signal having a magnitude proportional to the measured temperature. The detector array 52 may aggregate the signals from the thermopile elements, and output a signal to the controller 54 indicative of the two-dimensional temperature profile of the fluid flow path from the turbine 16 into the HRSG 26.

It should be appreciated that alternative embodiments may employ other band-pass filters having other wavelength ranges. Furthermore, certain embodiments may employ a high-pass filter, a low-pass filter, or may omit the filter. In further embodiments, the filter may be incorporated within the viewing port 66. Moreover, while a thermal radiation detector array 52 employing thermopile elements is employed in the present embodiment, it should be appreciated that other detector elements, such as CCD, FPA or pyrometer, may be employed in alternative embodiments.

The present thermal measurement system 50 also includes an optical focusing device, such as the lens 70, configured to focus the thermal radiation onto the detector array 52. As will be appreciated, the lens 70 may be composed of any suitable material, such as plastic or glass. In certain embodiments, the lens 70 may be combined with the filter 68 into a single element. In further embodiments, the lens 70 may be omitted such that thermal radiation passes directly onto the thermal radiation detector array 52.

The present embodiment also includes a second optical focusing device, such as the illustrated mirror 72. The mirror 72 is configured to direct thermal radiation from the conduits

60 onto the thermal radiation detector array 52. In certain embodiments, the minor 72 may include a substrate (e.g., glass, plastic, etc.) and a reflective coating (e.g., silver, chrome, etc.) disposed onto the substrate. Alternatively, the mirror 72 may be formed from a reflective material, such as polished stainless steel. The present embodiment employs a concave mirror 72 to establish a desired field of view 74. Due to the shape of the minor 72 and the position of the thermal radiation detector array 52, a field of view 74 having an angle 76 is established. For example, in certain embodiments, the angle 76 may be greater than approximately 5, 10, 20, 40, 60, 80, 100, 120, 140 or 160 degrees, or more. In certain embodiments, the thermal radiation detector array 52 may be directed toward the entire cross-section 78 of the HRSG 26 to establish a two-dimensional temperature profile of the fluid flow path. Consequently, the angle 76 may be selected such that the field of view 74 includes the entire HRSG cross-section 78 at the desired measurement location. As a result, the thermal measurement system 50 may detect any temperature variation within the fluid flow path. It should be appreciated that alternative embodiments may employ a convex minor or a substantially flat minor to direct the thermal radiation toward the detector array 52. In further embodiments, the mirror 72 may be omitted, and the thermal radiation detector array 52 may be directed toward the fluid flow path. In such embodiments, the lens 70, if present, may serve to establish a desired field of view 74 based on the shape and optical properties of the lens 70.

As previously discussed, the present thermal radiation detector array 52 includes thermopile elements configured to convert detected thermal radiation into an output signal. Because the thermopile elements include multiple thermocouples connected in series, the thermopile elements output an electrical signal having a magnitude proportional to a temperature of the region within the field of view of each respective element. The detector array 52 may aggregate the signals from the thermopile elements, and output a signal to the controller 54 indicative of the two-dimensional temperature profile of the fluid flow path from the turbine 16 to the HRSG 26. The controller 54 is configured to receive this signal, and to determine a two-dimensional temperature profile of the HRSG cross-section 78 based on the signal (e.g., via a look-up table, an algorithm, etc.). In the present embodiment, the controller 54 is communicatively coupled to a user interface 56 including a display 80 and an alarm 82. The display 80 is configured to present a graphical representation of the temperature detected by each thermopile element as a function of time.

As illustrated, the display 80 includes a graph 84 having an x-axis 86 representative of time, and a y-axis 88 representative of temperature. As previously discussed, each thermopile element of the detector array 52 is configured to output a signal indicative of the temperature of a region within the field of view of the element. In the present embodiment, the graph 84 includes a series of curves 90 that represents the temperature of each region as a function of time. The present graph 84 includes four curves 90, indicating that the thermal radiation detector array 52 includes four thermopile elements. However, it should be appreciated that the detector array 52 may include more or fewer elements, resulting in more or fewer curves 90 displayed on the graph 84.

The graph 84 also includes a dashed line 92 indicative of the average temperature of the fluid flow path. As previously discussed, the thermal radiation detector array 52 may be directed toward the entire cross-section 78 of the HRSG 26 to monitor the two-dimensional temperature profile of the fluid flow path. By averaging the temperature within each region (e.g., area within the field of view of each thermopile element), the average temperature of the fluid flow path may be computed. In certain embodiments, it may be desirable for the HRSG to receive a fluid flow having temperature variations within a defined range of the average fluid temperature. Consequently, the controller 54 may be configured to compare the temperature of each region to the average temperature to determine whether an excessive temperature variation is present. In such embodiments, the graph 84 includes a lower threshold 94 and an upper threshold 96 corresponding to the desired fluid temperature range. For example, it may be desirable for certain HRSGs to receive fluid within a 25, 20, 15, 10, 7, 5, or 3 degrees Celsius, or less, range of the average fluid temperature. In such configurations, the controller 54 may identify an excessive temperature variation within the HRSG 26 if a temperature within one region exceeds the upper threshold 96 or decreases below the lower threshold 94. Alternatively, the upper threshold 96 and the lower threshold 94 may be defined based on a percentage difference between the detected temperature and the average temperature. For example, in certain embodiments, it may be desirable for the HRSG 26 to receive fluid within a 15%, 12%, 10%, 8%, 6%, 4%, or less, range of the average fluid temperature.

In alternative embodiments, the controller 54 may be configured to detect an excessive temperature variation within the fluid flow path from the turbine 16 into the HRSG 26 by comparing a temperature difference between regions to a threshold value. In such embodiments, the display 80 may be configured to show a single curve indicative of a difference between the maximum detected temperature of a region and the minimum detected temperature of a region. The graph may also include a threshold indicative of the maximum desired temperature variation. If the temperature difference between the maximum detected temperature and the minimum detected temperature exceeds the threshold value, the controller 54 may identify an excessive temperature variation within the fluid flow path. For example, the threshold value indicative of an excessive temperature variation may be less than approximately 25, 20, 15, 10, 7, 5, or 3 degrees Celsius, or less, for certain HRSG configurations. Alternatively, the threshold value may be defined as a percentage difference between the minimum and maximum detected temperatures. In such a configuration, the threshold value may correspond to a 30%, 25%, 20%, 15%, 10%, 5%, or less, percentage difference. As will be appreciated, an excessive temperature variation may be detected by other statistical methods (e.g., standard deviation comparison) in alternative embodiments.

If an excessive temperature variation is detected, the controller 54 may activate the alarm 82 within the user interface 56. As previously discussed, the alarm 82 may be an audible alarm and/or a visual alarm configured to alert an operator of the detected condition. The operator may then take appropriate corrective action to resolve the fluid temperature variation. In addition, the controller 54 and/or the user interface 56 may be communicatively coupled to the power generation system 10, and configured to decrease and/or terminate fluid flow through the HRSG 26 upon detection of the excessive temperature variation. For example, in certain embodiments, if the temperature variation exceeds a first threshold value, the controller 54 may reduce turbine engine power, thereby decreasing flow through the HRSG 26. If the temperature variation exceeds a second threshold value, higher than the first threshold value, the controller 54 may activate a valve to bypass the HRSG 26, thereby terminating flow through the HRSG 26. As will be appreciated, bypassing the HRSG 26 may decrease power generation efficiency, but may still enable the power generation system 10 to provide electricity to consumers.

While the thermal measurement system 50 is described above with reference to an HRSG 26, it should be appreciated that the thermal measurement system 50 may be employed to detect temperature variations across fluid flow paths into other heat exchangers. For example, the thermal measurement system 50 may be utilized to detect temperature variations within the condenser 40. Similar to the HRSG 26, the condenser 40 includes multiple conduits configured to convey a secondary fluid, such as water, in a direction perpendicular to the flow of steam through the condenser 40. As the steam flows across the conduits, heat from the steam is transferred to water 42, thereby condensing the steam into water 44. As previously discussed, variations in the steam temperature distribution may induce density variations within the last stage of the steam turbine 34, thereby reducing turbine efficiency and/or inducing excessive wear on the turbine blades. By detecting excessive temperature variations, the thermal measurement system 50 may facilitate efficient operation of the steam turbine 34 and condenser 40 and/or serve to enhance the longevity of steam turbine components.

For example, if an excessive temperature variation is detected within the flow of steam 38, the controller 54 may activate the alarm 82 within the user interface 56 to alert an operator of the detected condition. The operator may then take appropriate corrective action to resolve the fluid temperature variation. In addition, the controller 54 and/or the user interface 56 may be communicatively coupled to the power generation system 10, and configured to decrease and/or terminate fluid flow through the condenser 40 upon detection of the excessive temperature variation. For example, in certain embodiments, if the temperature variation exceeds a first threshold value, the controller 54 may reduce steam flow 32 to the steam turbine 34. If the temperature variation exceeds a second threshold value, higher than the first threshold value, the controller 54 may activate a valve to bypass the steam turbine 34, thereby terminating flow through the steam turbine 34. As will be appreciated, bypassing the steam turbine 34 may decrease power generation efficiency, but may still enable the power generation system 10 to provide electricity to consumers.

Figure 3:
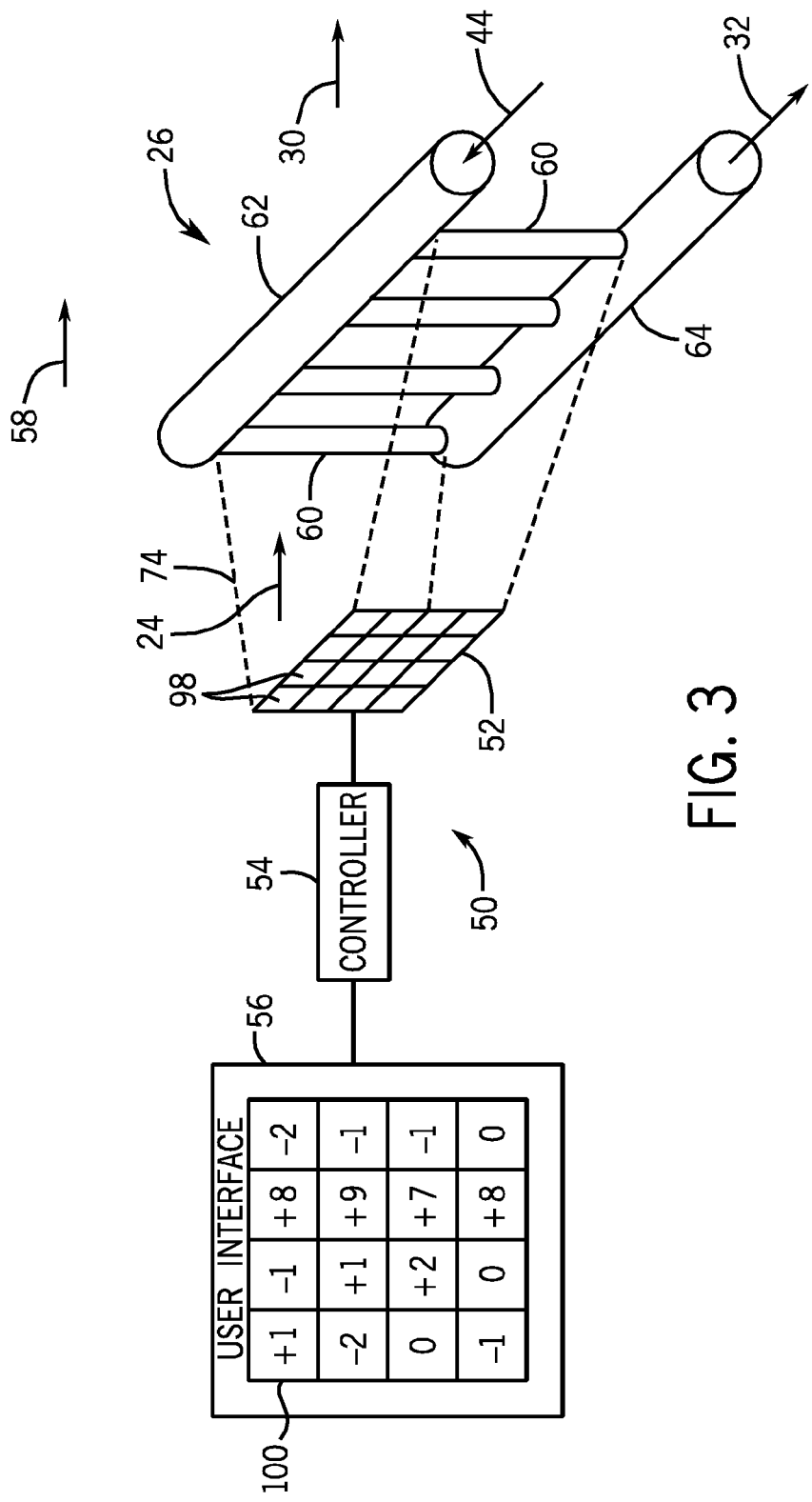
FIG. 3 is a schematic diagram of an embodiment of the thermal measurement system directed toward a cross-section of the HRSG upstream of fluid conduits.

FIG. 3 is a schematic diagram of an embodiment of the thermal measurement system 50 directed toward a cross-section of the HRSG 26 upstream of the fluid conduits 60. As previously discussed, the exhaust gas 24 flows into the HRSG 26 in the downstream direction 58. The HRSG 26 includes multiple conduits 60 configured to convey a secondary fluid, such as water, in a direction crosswise (e.g., substantially perpendicular) to the downstream direction 58. As the exhaust gas 24 flows across the conduits 60, heat is transferred from the exhaust gas 24 to the water, thereby producing steam. In the present embodiment, the water 44 is supplied to the conduits 60 by the first manifold 62, and the steam 32 is expelled through the second manifold 64. The steam 32 then flows toward the steam turbine 34, and the cooled exhaust gas flows toward the stack 28. While four conduits 60 are employed in the present embodiment, it should be appreciated that more or fewer conduits 60 may be utilized in alternative embodiments. For example, certain HRSGs 26 may include more than approximately 50, 75, 100, 125, 150, 175, 200, or more conduits 60.

The illustrated thermal radiation detector array 52 is directed toward the conduits 60 such that the entire cross-section of the fluid flow path upstream of the conduits 60 falls within the field of view 74 of the detector array 52. In this manner, the detector array 52 may monitor the two-dimensional temperature profile of the fluid flow path upstream of the conduits 60, thereby ensuring that substantially any temperature variation within the fluid flow will be detected. As previously discussed, the thermal radiation detector array 52 may include multiple thermopile elements 98, with each thermopile element directed toward a different region of the fluid flow cross-section. In this configuration, the thermal radiation detector array 52 may output a signal indicative of the temperature of each region such that the controller 54 may establish a two-dimensional temperature profile of the fluid flow path.

In the present embodiment, the thermal radiation detector array 52 includes a 4×4 matrix of thermopile elements 98. In this configuration, each column of the thermal radiation detector array 52 may be directed toward a respective conduit 60 such that a temperature of each conduit 60 may be independently monitored. However, it should be appreciated that alternative thermal radiation detector arrays 52 may include more or fewer thermopile elements 98, forming an N×N or M×N matrix. For example, certain thermal radiation detector arrays 52 may include approximately 1 to 1000, or more rows and/or approximately 1 to 1000, or more columns. In addition, while the illustrated radiation detector array includes a rectangular array of elements 98, it should be appreciated that certain thermal radiation detector arrays 52 may include a circular, elliptical or polygonal shaped array of elements 98. It should also be appreciated that alternative thermal radiation sensors (e.g., CCD, FPA, pyrometer, etc.) may form elements of the thermal radiation detector array 52. Furthermore, as previously discussed, the detector array 52 may include multiple N×N or M×N element arrays directed toward various two-dimensional regions of the fluid flow path, thereby enabling the controller 54 to generate a three-dimensional temperature profile of the fluid flow path. For example, 1, 2, 3, 4, 5, 6, 7, 8, 9, 10, or more two-dimensional arrays may be tightly spaced along the flow direction to establish an L×N×N or L×M×N three-dimensional detector array 52.

As will be appreciated, the overall sensitivity of the thermal measurement system 50 may be dependent on the sensitivity of the thermopile elements 98, the accuracy of the thermal radiation detector array 52, optical and/or electrically noise within the system 50, the accuracy of a signal conditioner within the controller 54, the quality of the thermal radiation sensor optics, the field of view of each thermopile element and/or the techniques used by the controller 54 to compute temperature, among other factors. For example, in certain embodiments, the thermal measurement system 50 may be able to identify temperature variations of less than approximately 2, 1, 0.75, 0.5, or 0.25 degrees Celsius, or less. Consequently, the thermal measurement system 50 may detect thermal variations within the fluid flow prior to substantial decreases in HRSG efficiency, thereby maintaining the efficiency of the power generation system 10. Because the sensitivity of the thermal measurement system 50 is at least partially dependent on the field of view of each thermopile element 98, it should be appreciated that thermal measurement system sensitivity may be enhanced by employing a larger number of thermopile elements 98. In this manner, each thermopile element 98 will monitor a smaller region of the fluid flow path, thereby increasing the sensitivity of each element 98.

Similar to the thermal measurement system 50 described above with reference to FIG. 2, the illustrated thermal measurement system 50 includes a user interface 56 communicatively coupled to the controller 54. The illustrated user interface 56 includes a numerical display 100 configured to present a numerical representation of the temperature of each region within the field of view 74 of the detector array 52. In the present embodiment, the display 100 is configured to output a temperature difference between each monitored region and an average temperature of the fluid flow path. It should be appreciated, that alternative embodiments may include a display 100 configured to present the absolute temperature of each region. In the present embodiment, the temperature values are shown in degrees Celsius.

As previously discussed, the controller 54 may be configured to detect an excessive temperature variation within the fluid flow path by comparing the temperature difference between each conduit 60 and the average fluid flow path temperature to a threshold value. In the illustrated embodiment, the threshold value is 5 degrees Celsius, which corresponds to the maximum desired temperature variation within the fluid flow path into the HRSG 26. As previously discussed, a higher or lower threshold value may be employed in alternative embodiments. Because the illustrated thermal radiation detector array 52 includes four rows of thermopile elements 98, each row measures the temperature of a respective conduit 60. As illustrated, each temperature within the left column of the display 100 indicates a temperature difference of less than 5 degrees Celsius from the average temperature. Similarly, each temperature difference within the right column and the column second from the left are within the 5 degree tolerance. Consequently, the display 100 indicates that the corresponding conduit 60 are receiving a fluid flow within the desired tolerance. In contrast, the temperature measurements corresponding to the second conduit 60 from the right indicate that the conduit 60 is receiving a fluid flow substantially hotter than the surrounding conduits 60. Specifically, the temperature of each region corresponding to the second conduit 60 from the right is more than 5 degrees Celsius higher than the average temperature. Therefore, the controller 54 will detect the excessive temperature variation, and activate an alarm, reduce fluid flow into the HRSG 26 and/or terminate flow to the HRSG 26.

In addition, the thermal measurement system 50 may be employed to detect temperature variations within the flow of steam 38 to the condenser 40. As previously discussed, variations in the steam temperature distribution may induce density variations within the last stage of the steam turbine 34, thereby reducing turbine efficiency. In addition, such density variations may induce excessive wear on the turbine blades as the blades pass through regions of varying density. Consequently, if the controller 54 detects that the steam flow adjacent to one conduit is warmer than the average steam flow temperature, the controller 54 may activate an alarm, reduce steam flow to the turbine 34/condenser 40 and/or terminate flow to the steam turbine 34.

Figure 4:
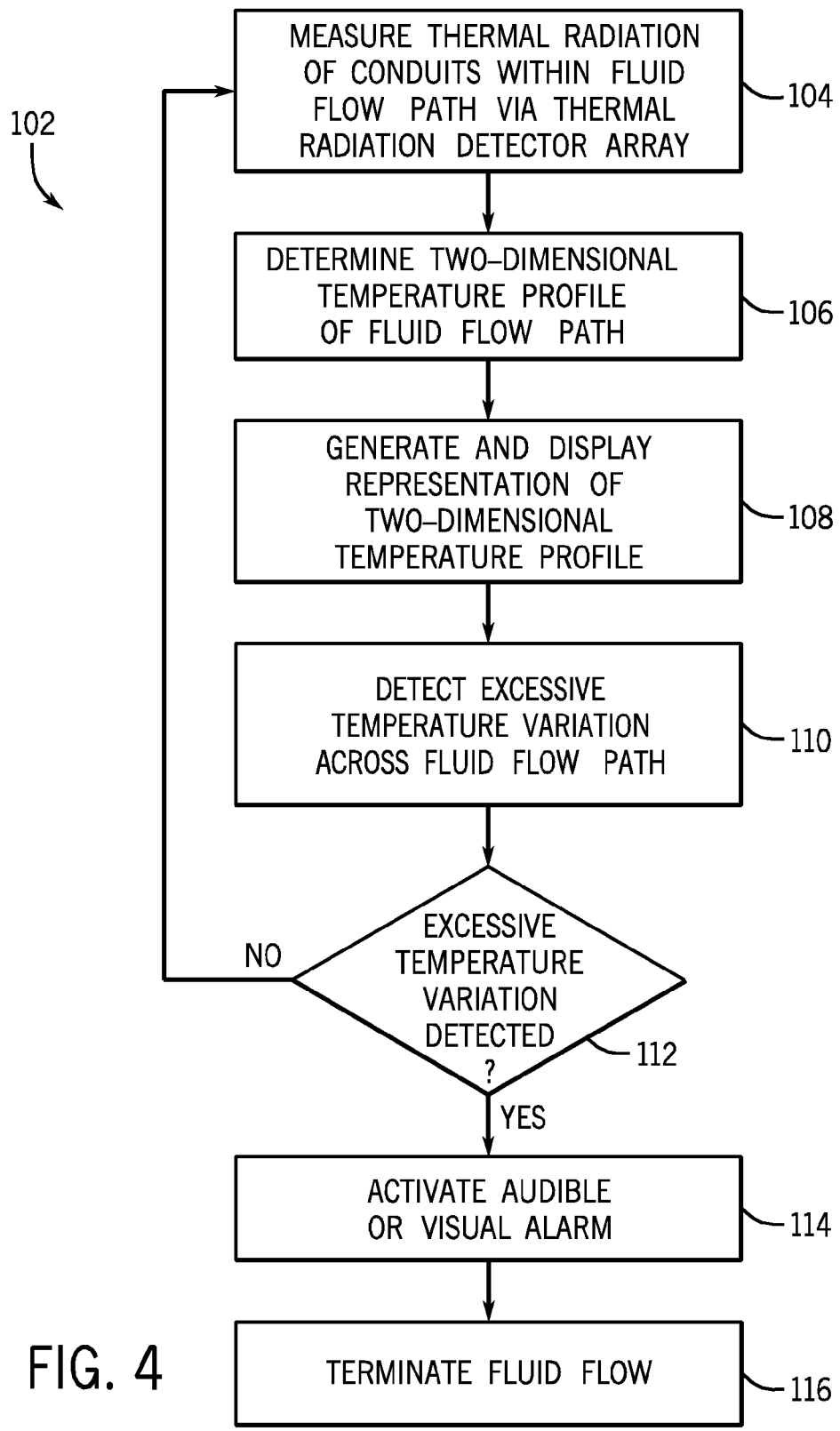
FIG. 4 is a flowchart of an embodiment of a method for detecting an excessive temperature variation across a fluid flow path by measuring thermal radiation of the fluid conduits via a thermal radiation detector array.

FIG. 4 is a flowchart of an embodiment of a method 102 for detecting an excessive temperature variation across a fluid flow path by measuring thermal radiation of the fluid flow conduits 60 via a thermal radiation detector array 52. First, as represented by block 104, thermal radiation of the conduits 60 within the fluid flow path is measured via the thermal radiation detector array 52. As previously discussed, the thermal radiation detector array 52 may include multiple thermopile elements, each directed toward a different region of the fluid flow. Each thermopile element is configured to output a signal having a magnitude proportional to the temperature of the respective region. The thermal radiation detector array 52 is configured to aggregate the signals from each element, and to output the resultant signal to the controller 54. Next, as represented by block 106, a two-dimensional temperature profile of the fluid flow path is determined based on the thermal radiation measurement. For example, the controller 54 may receive the resultant signal from the thermal radiation detector array 52, and determine the two-dimensional temperature profile based on the magnitude of each thermopile element signal. A representation of the two-dimensional temperature profile may then be generated and displayed, as represented by block 108. For example, the display 80 may present a series of curves 90 showing the temperature of each region as a function of time. Alternatively, the display 100 may present a numerical representation of the temperature of each region.

Next, as represented by block 110, an excessive temperature variation across the fluid flow path may be detected based on the two-dimensional temperature profile. For example, the controller 54 may be configured to detect the excessive temperature variation if a temperature difference between at least one conduit 60 and an average temperature of the fluid flow path exceeds a threshold value. Alternatively, the controller 54 may be configured to detect the excessive temperature variation if a temperature difference between a first conduit 60 and a second conduit 60 exceeds a threshold value. If an excessive temperature variation is detected, as represented by block 112, an audible and/or visual alarm may be activated to alert an operator of the condition, as represented by block 114. For example, once an operator has been informed of the condition, the operator may decrease and/or terminate flow through the HRSG 26 or condenser 40. In addition, flow through the heat exchanger may be automatically terminated upon detection of an excessive temperature variation, as represented by block 116. For example, in certain embodiments, the controller 54 may be communicatively coupled to the power generation system 10, and configured to decrease and/or terminate flow through the HRSG 26 and/or condenser 40 upon detection of the excessive temperature variation.

It should be appreciated that alternative actions may be taken by the operator or the controller 54 if an excessive temperature variation across the fluid flow path is detected. For example, if an excessive temperature variation is detected within the HRSG 26, the exhaust flow 24 may be redirected to the atmosphere, thereby bypassing the HRSG 26. Such a procedure may decrease the efficiency of the power generation system 10, but may still enable the power generation system 10 to provide electricity to consumers. Similarly, if an excessive temperature variation is detected within the condenser 40, the steam flow 32 may be redirected, thereby bypassing the steam turbine 34 and condenser 40. Such a procedure may protect the blades within the steam turbine 34 from excessive wear that may be induced by the density variations associated with an uneven steam temperature distribution.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a radiation detector array configured to direct a field of view toward a plurality of conduits within a fluid flow path from a turbine into a heat exchanger, wherein the radiation detector array comprises a plurality of thermopile elements, each thermopile element is directed toward a different region of the plurality of conduits, and the radiation detector array is configured to output a signal indicative of a multi-dimensional temperature profile of the fluid flow path based on thermal radiation emitted by the plurality of conduits; and a controller communicatively coupled to the radiation detector array, wherein the controller is configured to determine a temperature variation across the fluid flow path based on the signal, and to compare the temperature variation to a threshold value.

2. The system of claim 1, comprising an optical focusing device configured to focus the thermal radiation emitted by the plurality of conduits onto the radiation detector array.

3. The system of claim 2, wherein the optical focusing device comprises one of a minor, a lens, and a combination thereof.

4. The system of claim 1, comprising a band-pass filter disposed between the radiation detector array and the plurality of conduits.

5. The system of claim 1, wherein the radiation detector array is configured to detect thermal radiation having a wavelength within an infrared spectrum.

6. The system of claim 1, wherein the controller is configured to determine the temperature variation based on a temperature difference between at least one of the plurality of conduits and an average temperature of the fluid flow path.

7. The system of claim 1, wherein the controller is configured to determine the temperature variation based on a temperature difference between a first conduit and a second conduit.

8. The system of claim 1, comprising the turbine and the heat exchanger, wherein the turbine comprises a gas turbine and the heat exchanger comprises a heat recovery steam generator.

9. The system of claim 1, comprising the turbine and the heat exchanger, wherein the turbine comprises a steam turbine and the heat exchanger comprises a condenser.

10. A system comprising:
a turbine configured to provide a flow of a first fluid in a downstream direction;
a heat exchanger configured to receive the flow of the first fluid and to transfer heat from the first fluid to a second fluid, wherein the heat exchanger comprises a plurality of conduits configured to convey the second fluid through the flow of the first fluid; and
a radiation detector array directed toward a cross-section of the heat exchanger crosswise to a flow direction of the first fluid, wherein the radiation detector array comprises a plurality of thermopile elements, each thermopile element is directed toward a different region of the cross-section of the heat exchanger, and the radiation detector array is configured to output a signal indicative of a multi-dimensional temperature profile of the cross-section based on thermal radiation emitted by the plurality of conduits; and
a controller communicatively coupled to the radiation detector array, wherein the controller is configured to determine a temperature variation across the cross-section based on the signal, and to compare the temperature variation to a threshold value.

11. The system of claim 10, wherein the controller is configured to determine the temperature variation based on a temperature difference between at least one of the plurality of conduits and an average temperature of the cross-section.

12. The system of claim 10, wherein the radiation detector array is directed toward the cross-section of the heat exchanger upstream of the plurality of conduits.

13. The system of claim 12, wherein the radiation detector array is separated from the first fluid flow by a viewing port substantially transparent to wavelengths measured by the radiation detector array, and the radiation detector array is directed toward the viewing port.

14. A method comprising:
obtaining a measurement of thermal radiation from a fluid flow path from a turbine into a heat exchanger via a radiation detector array, wherein the radiation detector array comprises a plurality of thermopile elements, and each thermopile element is directed toward a different region of the fluid flow path;
determining a multi-dimensional temperature profile of the fluid flow path based on the measurement;
determining a temperature variation across the fluid flow path based on the multi-dimensional temperature profile; and
comparing the temperature variation to a threshold value.

15. The method of claim 14, wherein determining the temperature variation across the fluid flow path comprises one of computing a first temperature difference between at least one of a plurality of conduits within the fluid flow path and an average temperature of the fluid flow path, computing a second temperature difference between a first conduit and a second conduit within the fluid flow path, and a combination thereof.

16. The method of claim 14, comprising generating and displaying a graphical representation of the multi-dimensional temperature profile of the fluid flow path, or generating and displaying a numerical representation of the multi-dimensional temperature profile of the fluid flow path.

17. The method of claim 14, comprising activating an alarm if the temperature variation exceeds the threshold value.

18. The method of claim 14, comprising terminating fluid flow through the heat exchanger if the temperature variation exceeds the threshold value.

* * * * *